Sept. 25, 1962  G. A. LYON  3,055,713
WHEEL COVER
Filed Jan. 4, 1960  2 Sheets-Sheet 1
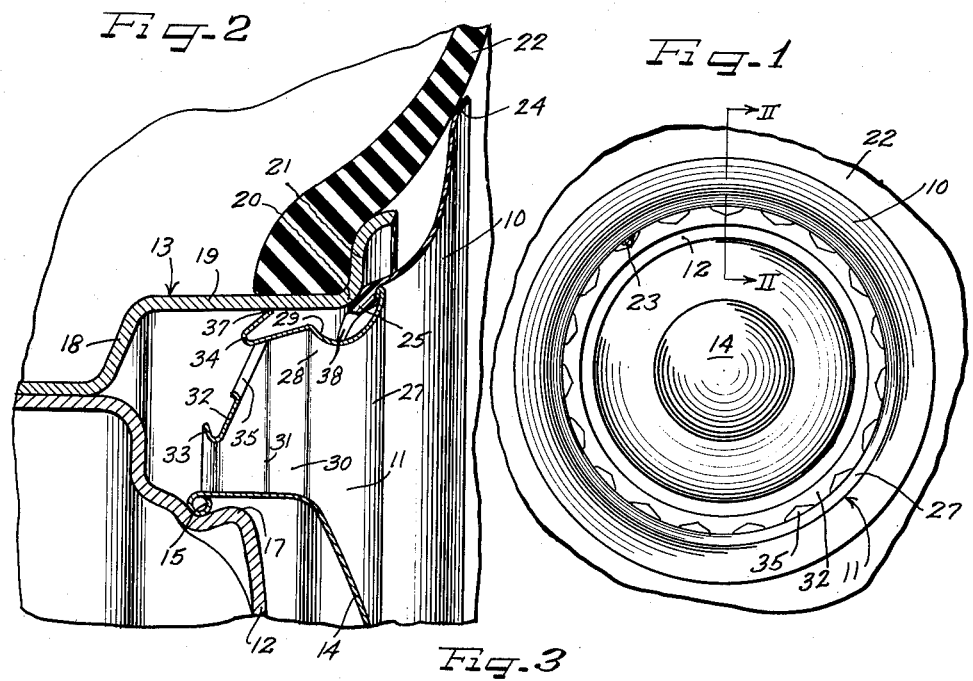
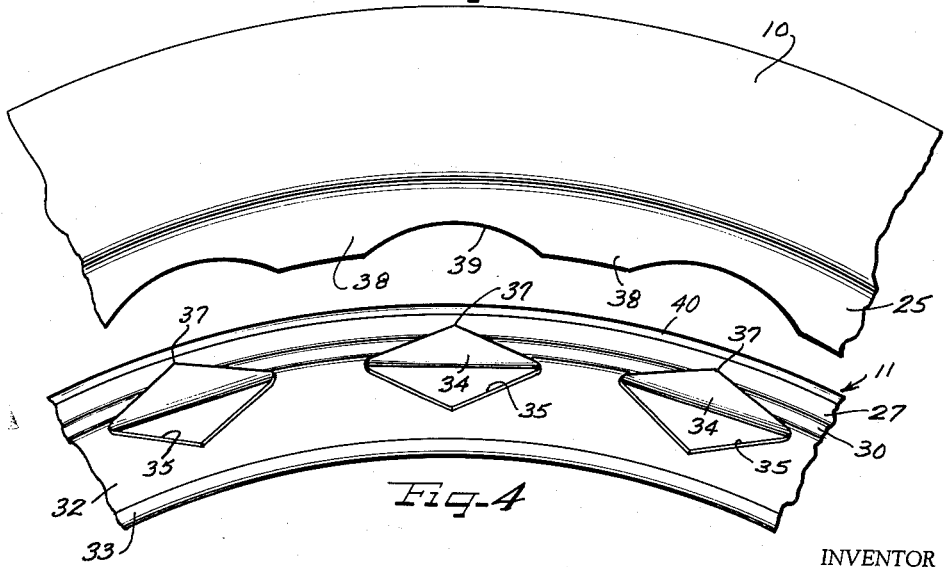
INVENTOR
George Albert Lyon
BY
ATTORNEYS Sept. 25, 1962
G. A. LYON
3,055,713
WHEEL COVER
Filed Jan. 4, 1960
2 Sheets-Sheet 2
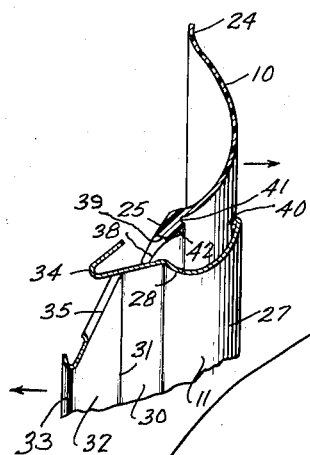
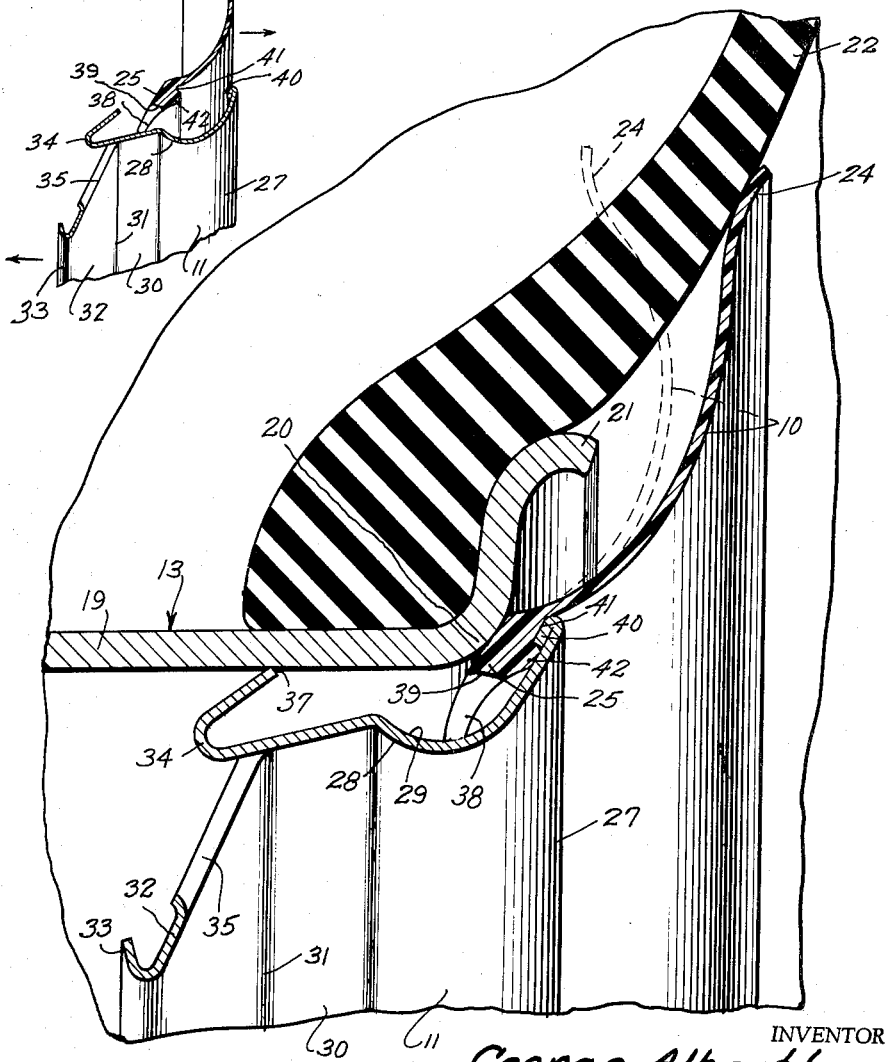
INVENTOR
George Albert Lyon
BY
ATTORNEY United States Patent Office 3,055,713
Patented Sept. 25, 1962

3,055,713
WHEEL COVER
George Albert Lyon, Detroit, Mich., assignor to Lyon Incorporated, Detroit, Mich., a corporation of Delaware
Filed Jan. 4, 1960, Ser. No. 436
4 Claims. (Cl. 301—37)

The present invention relates to improvements in wheel structures and more particularly concerns the ornamental and protective covering of the outer sides of vehicle wheels.

It is well known in the industry that white side wall tires are of less durability than tires having the ordinary black side walls. The reason for this is that allowance must be made in the curing process for the different character of the white rubber layer incorporated in the tire side walls and which white rubber layer will not withstand the same curing as the black rubber. On the other hand, production cost of the white side wall tires is higher than for black side wall tires. Since there is a large demand for white side wall tires, as well as the all black tires, it means that suppliers and also the automobile manufacturers must stock duplicate sizes in both types of tire.

In service, white side walls of tires are notoriously subject to scuffing, discoloration and unduly rapid soiling. Because of the rather porous surface of the white wall rubber, road dirt rapidly accumulates thereon and special cleansing and scrubbing techniques are required to maintain the white tire side walls presentable.

According to the present invention, it is an important object to provide improved means for providing tires mounted on automobile wheels with the appearance of having white or other colored side walls, but permitting the use of the more durable, less expensive black side wall tires.

Another object of the invention is to provide improved tire side wall simulating ring structure which is easier to keep clean and presentable than the normal tire white side wall and which if it is rendered unsightly by damage can be replaced at low cost.

A further object of the invention is to provide improved tire side wall simulating ring means which is especially constructed and arranged to supply optional equipment for automobile wheels so that the advantages of the ornamental effect of white side walls can be provided at any time and without changing tires on the wheels to be equipped with the ornamental rings.

Still another object of the invention is to provide a new and improved tire side wall ornamental ring structure which is adapted to be assembled optionally with a retaining cover member, which cover member may be used alternatively on a vehicle wheel with or without the ornamental side wall ring member.

Yet another object of the invention is to provide a new and improved cover assembly for disposition at the outer side of a vehicle wheel and which provides in association with a tire on the wheel the appearance of an ornamental tire side wall.

It is also an object of the invention to improve the ornamental appearance of the outer sides of vehicle wheels, especially by concealing the tire rim which is inherently unattractive in appearance due to its necessarily functionally angular contours and which may be even further disfigured by the application of wheel balancing weights to the terminal flange which according to the present invention is completely covered so that the wheel balancing weights and the terminal flange are entirely concealed.

A still further object of the invention is to provide an improved tire side wall simulating ring and retaining cover member assembly enabling quick manual assembly or disassembly of the members and unitary handling of the assembled members.

An additional object of the invention is to provide an improved tire trim ring structure especially suitable to be made from resiliently flexible dense plastic material and equipped with desirable interlock means which are interengageable with interlock structure on a retaining cover member to prevent pulling of the ring member from a clamped engagement thereof between a tire rim and the cover member.

According to general features of the present invention, there is provided in a wheel structure including a stepped multi-flanged tire rim including a radially inwardly facing rim flange as well as an annular rim shoulder disposed axially outwardly of the rim flange, a circular cover member having means on the radially inner side thereof cooperable with the wheel to maintain the cover in removable assembly on the wheel and having a radially outer marginal cover area confronting the annular rim shoulder, and a radially outer resiliently flexible thin plastic ring member of a diameter to overlie and appear to be a part of the side wall of a tire carried by the tire rim and having an inner underlapping thickened marginal ring area behind the outer marginal cover area and with the outer marginal cover area through the action of the cover retaining means clamping the inner underlapping marginal ring area against the annular rim shoulder and thereby sustaining the ring member in assembly on the wheel, said thickened marginal ring area and said marginal cover area having generally radially opposed interlock shoulders to retain the thickened marginal ring area against pulling out of the clamped engagement between the marginal cover area and said rim shoulder.

Another feature of the invention is to provide the ring member with a uniformly thinner section radially outwardly beyond said marginal ring area for enabling substantial axial flexing of the major portion of the ring member relative to said thickened marginal ring area.

A further feature of the invention resides in the provision on the inner terminus of the marginal ring area of radially inwardly directed retaining fingers which are of thinner section than the marginal ring area but are thick enough to be of substantial resilient stiffness for retaining interengagement with a flange portion of the cover member so that the cover member and the ring member can be handled as a unitary assembly when off of the wheel.

Other objects, features and advantages of the present invention will be readily apparent from the following detailed description of a preferred embodiment thereof taken in conjunction with the accompanying drawings, in which:

FIGURE 1 is an outer side elevational view of a wheel structure embodying features of the invention;

FIGURE 2 is an enlarged fragmentary radial sectional view taken substantially on the line II—II of FIGURE 1;

FIGURE 3 is a fragmentary rear elevational view of the ornamental side wall ring member;

FIGURE 4 is a fragmentary rear elevational view of the ring member-retaining cover member;

FIGURE 5 is a radial sectional view through the ring member and cover member showing the same in the course of being assembled together; and FIGURE 6 is an enlarged fragmentary radial sectional view similar to FIGURE 2 but illustrating certain relationships in the assembling of the trim structure with the wheel.

According to the present invention, a tire side wall simulating ornamental ring member 10 and a retaining cover member 11 are constructed and arranged to be applied in ornamental and protective relation over the outer side of a vehicle wheel and more particularly an automobile wheel including a disk spider wheel body 12 supporting a stepped, multi-flange tire rim 13. Although the cover member 11 is adapted to be of the full disk type wherein it entirely covers the wheel body 12 as well as a substantial portion of the tire rim 13, it is herein shown as an annulus coacting on the wheel with a central hub cap 14 suitably retained on the wheel as by an edge bead 15 engaging suitable cover retaining protrusions or bumps 17 on the wheel body 12. At its outer periphery the wheel body 12 suitably supports and is secured to the tire rim 13.

On its outer side, which is the side illustrated in FIG. 2, the tire rim 13 has a generally axially outwardly facing side flange 18 from which extends generally axially outwardly a radially inwardly facing intermediate flange 19 having a shoulder 20 disposed axially outwardly therefrom at juncture with a terminal flange 21. A pneumatic tire 22 is adapted to be supported by the tire rim 13 and a valve stem 23 projects from the side flange 18 for inflation of the tire.

Although the side wall ring member 10 may be made from various materials, especially satisfactory results are obtained where it is made from thin sheet-like synthetic plastic material possessed of resilient flexibility, durability, satisfactory color characteristics and smooth close grained and substantially non-porous surface finish. Improved synthetic plastics are now available, and a high density polyethylene plastic, which is stiffer and harder than some other types of similar material but possessed of considerable resiliency, is a preferred material. Such material lends itself readily to molding into the preferred shape and contours which will render the ornamental ring member 10 most efficient.

In outside diameter the ring member 10 is substantially larger than the terminal flange 21 of the tire rim to extend into engagement with the opposing side wall of the tire 22 sufficiently radially outwardly beyond the terminal flange to afford the appearance of being a part of the tire side wall. So that there will not be any tendency for abrasive contact with the tire side wall, the radially outer marginal terminus portion of the ring 10 is turned axially outwardly as shown at 24.

From adjacent to the outer marginal portion 24, the body of the ring member 10 extends on a generally axially outwardly arched but generally radially and axially inwardly extending slope to a radially inner marginal thickened ring area flange 25 defining a seat engaging the tire rim shoulder 20. Between the annular lines of engagement with respectively the tire side wall and the shoulder 20, the body of the ring 10 arches freely over the terminal flange 21 and provides a chamber therewith in which the usual wheel balancing weights may be accommodated conveniently. In the preferred form shown, the body of the ring member 10 radially outwardly beyond the thickened inner marginal area or flange 25 is substantially thinner than the thickened inner marginal flange and preferably of a uniform thin section so as to be substantially resiliently flexible in engagement with the tire side wall.

Retention of the side wall ring member 10 on the wheel is accomplished by means of the annular cover member 11 which for this purpose has an annular outer marginal area 27 of a diameter to confront the rim shoulder 20 with the ring member seat flange 25 underlapping the cover marginal area and thereby clamped against the rim shoulder. Suitable thin sheet metallic material such as stainless steel is used in the cover member 11 which may be suitably finished as by polishing and plating or painted, or a combination of plating and painting.

From its outer marginal clamping area 27, the cover member 11 extends radially and axially inwardly, with a generally radially outwardly and axially inwardly turned annular portion 28 defining with the outer margin of the cover member a generally radially outwardly opening groove 29 and providing a radially inwardly projecting annular reinforcing rib. Projecting generally axially inwardly and radially inwardly from the turned portion 28 is an intermediate annular flange portion 30 disposed in spaced telescoped relation to the intermediate flange 19 of the tire rim and joining on an annular reinforcing rib 31 a generally radially inwardly extending inner marginal annular flange portion 32 of an inside diameter to overlie the radially outer portion of the wheel body 12 and having an underturned reinforcing and finishing annular flange 33, with the edge extremity at juncture of the flange 33 with the marginal portion 32 confronting the adjacent margin of the hub cap 14.

Wheel engaging cover retaining structure is provided on the axially inner side of the cover member 11, in the present instance comprising a circumferentially spaced series of cover retaining fingers 34 derived from material struck from openings 35 in the inner marginal annular cover portion 32. Each of the retaining fingers 34 has a biting, gripping tip 37 engageable retainingly with the radially facing rim flange 19. Through the action of the retaining fingers 34 maintaining the cover member 11 on the tire rim, the outer marginal cover area 27 is maintained in clamping engagement with the ring member seat area 25.

It is a convenience to have the ring member 10 and the cover member 11 retained in an assembled relation for handling as a unit off of the wheel. For this purpose, the members have interengaging means located radially inwardly from the rim flange shoulder engaging areas of the members. In a desirable form the ring member inner marginal seat area flange 25 has an inner terminal retaining extension portion 38 projecting generally radially inwardly to engage interlockingly with shoulder structure afforded by and within the groove 29 of the cover member. In a preferred form, the retaining extension means 38 comprises a curvingly radially inwardly turned flange portion the edge of which is on a slightly smaller diameter differentially relative to the deepest portion of the groove 29 so that the terminal edge normally seeks such deepest portion. At the same time, the construction and relationship is such that with the terminal flange portion edge tensionably seated in the groove 29, the annular seat area flange 25 of the ring member is held against or at least close to the cover marginal area 27.

Assembly of the ring member 10 with the cover member 11 is adapted to be effected by a relative axial assembly movement of the members whereby to move the inner margin of the ring member 10 into the assembled relationship from the back or axially inner side of the cover member. To this end, the inner marginal terminal retaining extension flange portion 38 of the ring member is provided with cut out notches 39 of sufficient depth and width substantially to clear the retaining fingers 34 of the cover member, as best seen in FIG. 3 on comparison with FIG. 4.

For assembling the members, they are coaxially aligned with the gripping edge of the retaining terminal flange portion 38 on finger-like portions between the notches 39 located between the cover retaining fingers 34 and the notches aligned with the fingers. Then upon effecting relative axial movement of the ring and cover members substantially as indicated by the directional arrows in FIGURE 5, the terminal extension flange fingers cam axially along the cover member intermediate flange portion 30 and are flexibly turned generally axially inwardly until they enter the groove 29, whereupon the terminal extension flange portion 38 snaps resiliently and tensionably grippingly into the groove to retain the ring member 10 assembled with the cover member 11. Removal of the ring member 10 from the cover member 11 may be effected by a reverse relative axial movement of the members, with the terminal extension flange portion 38 resiliently turning flexibly yielding to escape from within the groove 29 past the inturned portion 28 of the cover member until the members are separated.

Application of the ring and cover assembly over the outer side of the wheel is effected by generally axially orienting the assembly with the wheel and with the valve stem 23 aligned through one of the cover member openings 35. Then axially inward pressure is applied to the cover member 11 to effect engagement of the retaining fingers 34 with the rim flange 19, the tips 37 of the retaining fingers being cammed radially inwardly from a slightly larger differential diameter than the engaged face of the rim flange to thereby effect firm tensioned grip against the rim flange.

Before being applied to the outer side of the wheel, the ring member 10 in the thin tire side wall covering and engaging portion thereof extends in axially outwardly arched radial contour but with the radially outer terminus disposed in an axially inward position generally radially outwardly opposite the inner thickened marginal flange area portion 25, as shown in full outline in FIGURE 5 and in dash outline in FIGURE 6. Then, as the ring and cover assembly is pressed axially inwardly home onto the wheel, the outer marginal terminus portion 24 of the ring member bears against the tire side wall while the inner marginal flange area 25 is deflected axially inwardly toward and into engagement with the rim shoulder 20. As a result, the resiliently flexible body of the ring member 10 resiliently flexes into the position shown in full line in FIGURE 6, as well as in FIGURE 2 and is placed under substantial resilient tension, maintaining the radially outer terminus portion 24 of the ring bearing firmly against the tire side wall which it hugs throughout flexing movements of the tire side wall in running of the wheel as it supports a vehicle.

Upon attainment of the fully engaged, seated relation of the ring and cover assembly on the wheel, an outer terminal underturned annular reinforcing and finishing flange 40 on the cover member clamping area portion 27 is engaged clampingly within a groove 41 defined between an annular rib 42 projecting axially outwardly on the axially outer side of the thickened inner marginal flange 25 of the ring member 10 and the juncture of the arched body portion of the ring member with the inner marginal flange. It will be observed that the flange 40 and the groove 41 are located axially outwardly opposite the rim shoulder 20 and thereby the portion of the inner marginal thickened flange 25 of the ring member between the underturned clamping flange 40 of the cover member and the shoulder 20 of the rim is firmly clamped against the rim shoulder. This clamping relationship is enhanced by opposition of the crest of the rib 42 to the axially inner side of the cover member marginal portion 27.

Pulling out of the inner thickened marginal flange portion of the ring member from the clamped retained position thereof is substantially resisted by virtue of the stiffness thereof so that it is resistant to deforming deflections, especially in a generally radial direction, particularly under the confinement between the cover member portion 27 and the rim shoulder 20 in the clamped-on assembled condition. Pull-out is additionally strongly resisted by coaction of the ring member rib 42 serving as a pull-out preventing shoulder projection interlockingly opposing the generally radially inwardly directed edge of the underturned cover flange 40 serving as an interlock shoulder for this purpose.

Removal of the ring and cover assembly from the wheel may be effected by flexing the thin body of the ring member 10 generally axially outwardly sufficiently to gain access by a pry-off tool behind the inner ring flange portion 25 and thus behind the flange 40 of the cover member 11 to effect axially outward pry-off force to dislodge the retaining fingers 34 from their gripping engagement with the rim flange 19. After removal from the wheel, the assembly can be handled as a unit since the tips of the notch-divided fingers of the inner ring terminal flange portion 38 are interlockingly retained in the groove 29 and more particularly between the retaining shoulders provided by the turned cover member portion 28 at the axially inner side of the groove and by the cover portion 27 at the axially outer side of the groove.

It will be understood that modifications and variations may be effected without departing from the scope of the novel concepts of the present invention.

I claim as my invention:

1. In a wheel structure including a stepped multi-flanged tire rim including a radially inwardly facing rim flange as well as an annular rim shoulder disposed axially outwardly of the rim flange, a circular cover member having means on the radially inner side thereof cooperable with the wheel to maintain the cover in removable assembly on the wheel and having a radially outer marginal cover area confronting the annular rim shoulder, and a radially outer resiliently flexible thin plastic ring member of a diameter to overlie and appear to be a part of the side wall of a tire carried by the tire rim and having an inner underlapping thickened marginal ring area behind the outer marginal cover area and with the outer marginal cover area through the action of the cover retaining means clamping the inner underlapping marginal ring area against the annular rim shoulder and thereby sustaining the ring member in assembly on the wheel, said thickened marginal ring area and said marginal cover area having generally radially opposed interlock shoulders to retain the thickened marginal ring area against pulling out of the clamped engagement between the marginal cover area and said rim shoulder, the inner terminus of the marginal ring area having radially inwardly directed retaining finger-like portions which are of thinner section than the marginal ring area but are thick enough to be of substantial resilient stiffness for retaining interengagement with a flange portion of the cover member so that the cover member and the ring member can be handled as a unitary assembly when off of the wheel.

2. In a trim assembly for disposition over the outer side of a vehicle wheel, a tire side wall simulating resiliently flexible ring member having an inner seating area for engagement with a tire rim, said seating area having a generally axially outwardly opening annular groove and also having an inner terminal flange portion, a circular cover member having an outer marginal area provided with an underturned flange seating in said groove, said cover member having radially and axially inwardly adjacent to said outer marginal area a shoulder structure engaged by said inner terminal flange portion of the ring member, said cover member having axially inwardly from said shoulder structure a plurality of generally radially outwardly projecting circumferentially spaced cover retaining fingers and said terminal flange portion of the ring member having notches therein for clearing said fingers to enable axial relative assembly of the ring member from the axially inner side of the cover member to engage said terminal flange portion of the ring member with said shoulder structure.

3. In a wheel structure including a stepped multi-flanged tire rim including a radially inwardly facing rim flange as well as an annular rim shoulder disposed axially outwardly of the rim flange, a circular cover member having means on the radially inner side thereof cooperable with the wheel to maintain the cover in removable assembly on the wheel and having a radially outer marginal cover area confronting said annular rim shoulder, and a radially outer resiliently flexible ring member of a diameter to overlie and appear to be a part of the side wall of a tire carried by the tire rim and having an inner underlapping marginal ring area behind the outer marginal cover area and with the outer marginal cover area through the action of the cover retaining means clamping the inner underlapping marginal ring area against the annular rim shoulder and thereby sustaining the ring member in assembly on the wheel, said underlapping marginal ring area and said outer marginal cover area having interengaging shoulders to retain the ring member against pulling out from under said outer marginal cover area, the cover member having radially inwardly relative to said outer marginal cover area a generally radially outwardly opening groove and the ring member having extending generally radially inwardly from its underlapping marginal area a circumferentially spaced series of resiliently flexible finger-like portions constructed and arranged to snap resiliently and tensionably grippingly into the groove by relative axial assembly movement of the members and to resiliently flex out of said groove upon relative axial disassembly movement of the members.

4. In a trim assembly for disposition over the outer side of a vehicle wheel, a resiliently flexible trim member for disposition over the outer side wall of a tire and having a radially inner area for engaging a tire rim, said radially inner area having at the radially inner terminus thereof a circumferentially disposed series of separated portions bowed axially inwardly and with the tips thereof projecting generally radially inwardly, and a cover member having an outer clamping margin behind which said radially inner area of the ring member is underlapped, said radially inner area of the ring member and said outer clamping margin having interengaging shoulder means to interlock said trim member against radial displacement relative to the cover member, said cover member having a generally radially outwardly opening groove disposed axially inwardly relative to said clamping margin and within which groove said separated portions of the ring member are retainingly engaged, said separated portions normally projecting to a slightly smaller diameter than the deepest portion of the groove and having their edges tensionably seated therein.

References Cited in the file of this patent

UNITED STATES PATENTS

| | | |
|---|---|---|
| 2,368,237 | Lyon | Jan. 30, 1945 |
| 2,413,328 | Lyon | Dec. 31, 1946 |
| 2,862,769 | Wood | Dec. 2, 1958 |
| 2,909,390 | Wood | Oct. 20, 1959 |
| 2,915,335 | Barnes | Dec. 1, 1959 |
| 2,937,901 | Wood | May 24, 1960 |
| 2,963,319 | Barnes | Dec. 6, 1960 |
| 2,964,357 | Barnes | Dec. 13, 1960 |

FOREIGN PATENTS

| | | |
|---|---|---|
| 1,061,278 | France | Nov. 25, 1953 |